US009459778B2

(12) United States Patent
Hogeg et al.

(10) Patent No.: US 9,459,778 B2
(45) Date of Patent: Oct. 4, 2016

(54) METHODS AND SYSTEMS OF PROVIDING VISUAL CONTENT EDITING FUNCTIONS

(75) Inventors: Moshe Hogeg, Meitar (IL); Yosef Shemesh, Tel-Aviv (IL)

(73) Assignee: Mobli Technologies 2010 Ltd., Tel-Aviv (IL)

( * ) Notice: Subject to any disclaimer, the term of this patent is extended or adjusted under 35 U.S.C. 154(b) by 186 days.

(21) Appl. No.: 14/232,274

(22) PCT Filed: Jul. 10, 2012

(86) PCT No.: PCT/IL2012/050242
§ 371 (c)(1),
(2), (4) Date: Jan. 12, 2014

(87) PCT Pub. No.: WO2013/008238
PCT Pub. Date: Jan. 17, 2013

(65) Prior Publication Data
US 2014/0173424 A1    Jun. 19, 2014

Related U.S. Application Data

(60) Provisional application No. 61/506,670, filed on Jul. 12, 2011.

(51) Int. Cl.
*G06F 3/048* (2013.01)
*G06F 3/0484* (2013.01)
*H04N 21/472* (2011.01)
(Continued)

(52) U.S. Cl.
CPC ......... *G06F 3/04845* (2013.01); *G06F 3/0482* (2013.01); *G11B 27/034* (2013.01); *H04N 21/4788* (2013.01); *H04N 21/47205* (2013.01); *H04L 51/32* (2013.01)

(58) Field of Classification Search
CPC ......... G06F 8/38; G06F 9/4428; G06F 17/24
See application file for complete search history.

(56) References Cited

U.S. PATENT DOCUMENTS 5,883,639 A * 3/1999 Walton ............... G06T 1/00
345/473
7,020,494 B2   3/2006 Spriesterbach et al.
(Continued)

FOREIGN PATENT DOCUMENTS

WO    WO 01/29642      4/2001
WO    WO 2013/008238   1/2013

OTHER PUBLICATIONS

Paint Shop Pro 9, Ken McMahon et al. published Mar. 22, 2005, pp. 1-4    http://academic.safaribooksonline.com/book/photo-and-graphic-manipulation/9780240519814.*

(Continued)

*Primary Examiner* — Scott Baderman
*Assistant Examiner* — Mario M Velez-Lopez

(57) ABSTRACT

A method of adjusting visual content. The method comprises selecting, on a client terminal, visual content, extracting visual content data pertaining to the visual content, forwarding a request which includes the visual content data to a network node via a network, receiving, in response to the request, a list of a plurality of visual content editing functions from the network node, presenting, on the client terminal, the plurality of visual content editing functions to a user, receiving a selection of at least one member of the list from the user, adjusting the visual content using the at least one member, and outputting the adjusted visual content.

19 Claims, 3 Drawing Sheets

(51) Int. Cl.
*H04N 21/4788* (2011.01)
*G11B 27/034* (2006.01)
*G06F 3/0482* (2013.01)
*H04L 12/58* (2006.01)

(56) References Cited

U.S. PATENT DOCUMENTS

| | | | |
|---|---|---|---|
| 8,161,417 B1 * | 4/2012 | Lee | G06F 3/0487 715/790 |
| 8,195,203 B1 * | 6/2012 | Tseng | H04M 1/72569 455/414.3 |
| 2002/0097257 A1 * | 7/2002 | Miller | G11B 27/034 715/723 |
| 2003/0148773 A1 | 8/2003 | Spriesterbach et al. | |
| 2003/0229607 A1 | 12/2003 | Zellweger et al. | |
| 2005/0022211 A1 * | 1/2005 | Veselov | G06F 9/542 719/318 |
| 2007/0255456 A1 * | 11/2007 | Funayama | H04N 1/32128 700/266 |
| 2008/0148150 A1 * | 6/2008 | Mall | G06F 3/048 715/707 |
| 2008/0214210 A1 * | 9/2008 | Rasanen | H04W 4/02 455/456.3 |
| 2008/0318616 A1 * | 12/2008 | Chipalkatti | H04W 12/08 455/550.1 |
| 2009/0089710 A1 * | 4/2009 | Wood | G11B 27/034 715/835 |
| 2009/0163182 A1 * | 6/2009 | Gatti | G06F 9/4443 455/414.1 |
| 2009/0234815 A1 * | 9/2009 | Boerries | G06F 17/30867 |
| 2009/0249244 A1 * | 10/2009 | Robinson | G06F 3/0481 715/781 |
| 2009/0288022 A1 * | 11/2009 | Almstrand | G06F 9/4443 715/762 |
| 2012/0124126 A1 * | 5/2012 | Alcazar | H04L 67/02 709/203 |
| 2014/0096029 A1 * | 4/2014 | Schultz | G06F 3/0484 715/747 |

OTHER PUBLICATIONS

MakeUseOf "Instagram: Beautiful Photo Editing and Sharing App for iPhone", MakeUseOf, Retrieved From the Internet, Oct. 15, 2010.*
addictivetips.com, Top 10 Android Apps for Photo Editing, Styling and Sharing, Jun. 20, 2011, pp. 1-12 http://www.addictivetips.com/mobile/top-10-android-apps-for-photo-editing-styling-and-sharing/.*
"Dear All Photo Apps: Mobli Just Won Filters", Sep. 8, 2011, pp. 1-8 http://techcrunch.com/2011/09/08/mobli-filters/.*
International Preliminary Report on Patentability Dated Jan. 23, 2014 From the International Bureau of WIPO Re. Application No. PCT/IL2012/050242.
Examination Report Dated Dec. 12, 2014 From the Instituto Mexicano de la Propiedad Industrial Re. Application No. MX/a/2014/000392 and Its Summary in English.
Supplementary European Search Report and the European Search Opinion Dated Feb. 4, 2015 From the European Patent Office Re. Application No. 12811671.2.
International Search Report and the Written Opinion Dated Nov. 9, 2012 From the International Searching Authority Re. Application No. PCT/IL2012/050242.

* cited by examiner

METHODS AND SYSTEMS OF PROVIDING VISUAL CONTENT EDITING FUNCTIONS

RELATED APPLICATIONS

This application is a National Phase of PCT Patent Application No. PCT/IL2012/050242 having International filing date of Jul. 10, 2012, which claims the benefit of priority under 35 USC §119(e) of U.S. Provisional Patent Application No. 61/506,670 filed on Jul. 12, 2011. The contents of the above applications are all incorporated by reference as if fully set forth herein in their entirety.

FIELD AND BACKGROUND OF THE INVENTION

The present invention, in some embodiments thereof, relates to image processing and, more particularly, but not exclusively, to systems and methods of selectively adjusting visual content on client terminals.

Emerging telecommunications services enable client terminals, such as handheld devices, i.e. cell phones and tablets to exchange data containers of different types and/or to post these data containers in a content sharing platform. For example, a data container may include data representing a text segment, an image, an audio signal, and/or a video signal.

For example, Twitter™ offers a social networking and microblogging service, enabling its users to send and read messages, also referred to as tweets. Tweets are text-based posts of up to 140 characters displayed on the user's profile page.

Other examples include real-time visual media sharing platforms which allow a user to share with his friends an image he or she captured, for example in a social network such as Facebook™ and/or other users of the real-time visual media sharing platforms. Examples of such real-time visual media sharing platforms are Mobli™, Instagram™, and Twitter™.

Some of these real-time visual media sharing platforms suggest functions that allow the user to edit the shared image, for example using color filters and/or the like.

SUMMARY OF THE INVENTION

According to some embodiments of the present invention, there is provided a method of selecting visual content editing functions. The method comprises storing a plurality of records each with suitability data of one of a plurality of visual content editing functions, receiving, from a client terminal, a request with visual content data pertaining to a visual content, selecting a group from the plurality of visual content editing functions according to the visual content data, and responding to the request of the client terminal by sending a response with a list which comprises at least one of a plurality of members of the group and a plurality of indications for the plurality of members.

Optionally, the method further comprises capturing the visual content using an image sensor installed in the client terminal.

Optionally, the visual content data comprises positional data pertaining to the client terminal, the selecting being performed according to the positional data.

More optionally, the selecting comprises using the positional data to classify the location of the client terminal, the selecting being performed according to the classification.

Optionally, the visual content data comprises a velocity of the client terminal, the selecting being performed according to the velocity.

Optionally, the method further comprises analyzing textual content a plurality of content providing network sources to identify at least one current event, the selecting being performed according to the at least one current event.

More optionally, the analyzing comprises at least one of a semantic analysis and a statistic analysis of the textual content.

More optionally, the method further comprises acquiring at least one demographic characteristic of a user of the client terminal; wherein the selecting is performed according to the at least one demographic characteristic.

More optionally, the storing comprises automatically generating at least some of the plurality of visual content editing functions according to at least one of the visual content data, personal data pertaining to a user of the client terminal, and information acquired from textual content a plurality of content providing network sources.

Optionally, the request comprises user identification, the selecting comprises acquiring personal data pertaining to a user of the client terminal according to the user identification, the selecting being performed according to the personal data.

More optionally, the personal data being extracted from a social network profile.

More optionally, the personal data comprises a log of previously selected visual content editing functions from the plurality of visual content editing functions.

More optionally, the request comprises user identification, the selecting comprises acquiring social network data pertaining to a friend of a user of the client terminal in a social network according to the user identification, the selecting being performed according to the social network data.

According to some embodiments of the present invention, there is provided a method of adjusting visual content. The method comprises selecting visual content on a client terminal, extracting visual content data pertaining to the visual content, forwarding a request which includes the visual content data to a network node via a network, receiving, in response to the request, a list of a plurality of visual content editing functions from the network node, presenting, on the client terminal, the plurality of visual content editing functions to a user, receiving a selection of at least one member of the list from the user, adjusting the visual content using the at least one member, and outputting the adjusted visual content.

Optionally, the selecting comprises locally capturing the visual content using an image sensor installed in the client terminal.

Optionally, the selecting comprises accessing a database via the network and selecting the visual content using a user interface on the client terminal.

Optionally, the extracting comprises image processing the visual content to perform at least one of identifying an object having a predefined feature in the visual content, classifying a scene depicted in the visual content, recognizing a facial feature in the visual content, and detecting a moving object in the visual content and the request comprises an outcome of the image processing.

More optionally, the method further comprises identifying positional data of the client terminal; the visual content data comprises the positional data.

Optionally, the request comprises user identification data; further comprising extracting personal data according to the user ID; wherein the list being formed according to the personal data.

Optionally, the adjusting comprises acquiring the at least one member from the network node.

According to some embodiments of the present invention, there is provided a system of providing a plurality of visual content editing functions to a plurality of client terminals. The system comprises a network interface which receives a request having from a client terminal, a repository which stores a plurality of records each with suitability data of one of a plurality of visual content editing functions, and a selection module which selects a group of the plurality of visual content editing functions according to the visual content data and generates a list which comprises at least one of a plurality of members of the group and a plurality of indications for the plurality of members. The network interface sends the list as a response to the request.

Optionally, the system further comprises a plurality of client modules each allows a user to create a visual content editing function and update the repository with the created visual content editing function.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
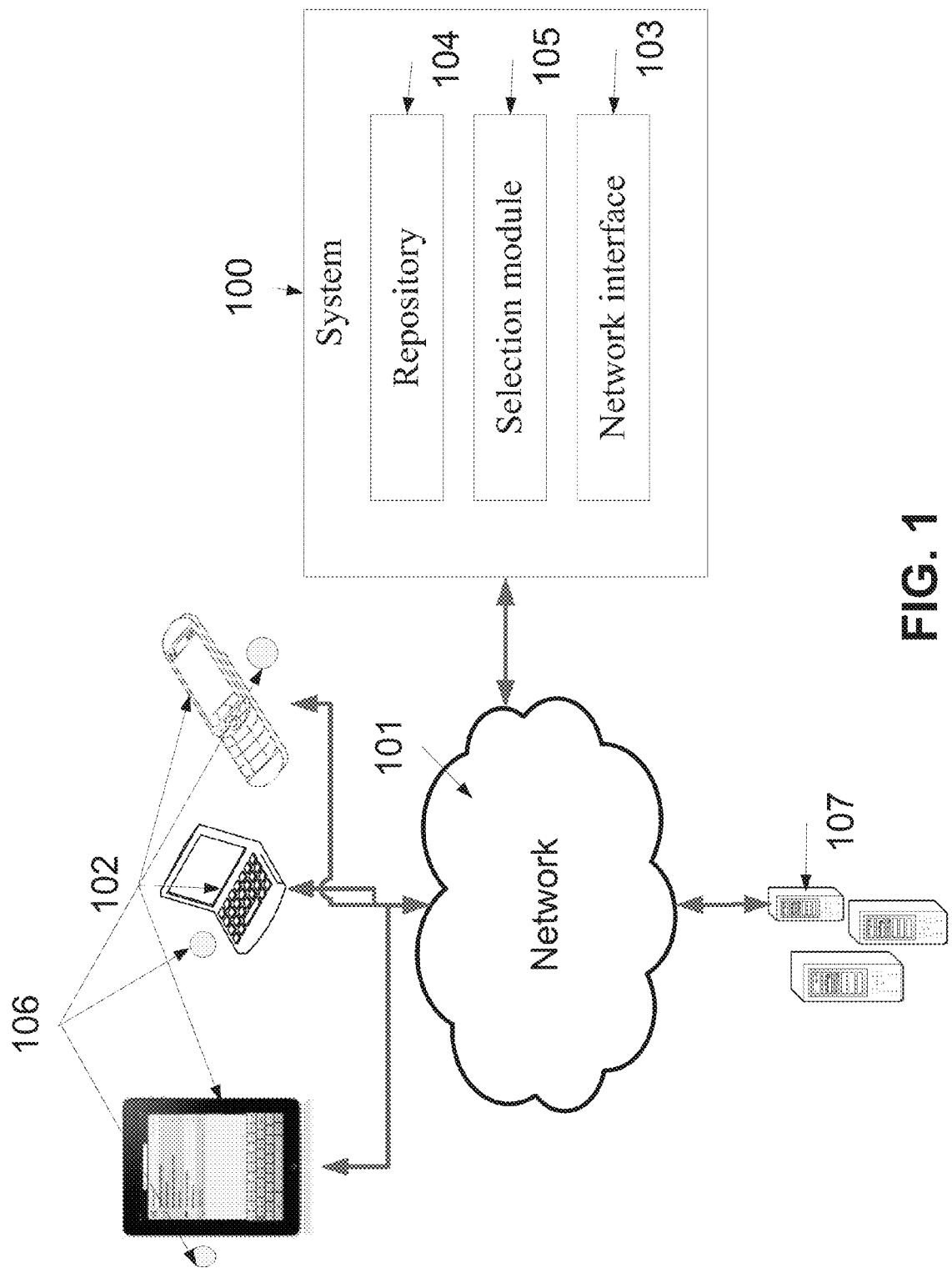
FIG. 1 is a schematic illustration of a system, which is connected via a communication network, to client terminals and provides thereto a list of functions for editing visual content, according to some embodiments of the present invention.

The present invention, in some embodiments thereof, relates to image processing and, more particularly, but not exclusively, to systems and methods of selectively adjusting visual content on client terminals.

According to some embodiments of the present invention, there are methods and systems which provide a remote client terminal with a plurality of visual content editing functions, such as image processing filters and/or overlays, for adjusting a certain visual content based on data extracted therefrom and/or related thereto, real time data, such as news events, and/or personal data related to the user of the client terminal. Optionally, the overlays include sound overlays which are designed to be added to the visual content. The system provides the user with a list of visual content editing functions which are adapted to his needs, preferences and/or to a currently captured visual content. In such a manner, the user is not bound to choose from a fixed set of visual content editing functions and/or has to review a huge collection of visual content editing functions. The selected list exposes the user to different visual content editing functions, which are adapted to his current needs, preferences and/or to a currently captured visual content, such as an image or a video file (i.e. video files, multimedia files, and audio/video files). For example, the system allows a user to receive location based visual content editing functions which allow him to add automatically suitable graphics and/or text by a single click on the presented list. The system further allows a user to receive visual content editing functions which are frequently used by his friends (i.e. social network friends, followers and/or followed users), frequently used by him, and/or suitable to a set of circumstances under which the respective visual content is taken.

Optionally, the system includes a repository with visual content editing functions which are generated in real time according to local and/or global news events and/or visual content editing functions which are generated to meet the needs of any of a plurality of subscribers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a system 100, optionally a network node, which is connected, via a communication network 101, such as the internet, to a plurality of client terminals and provides to these client terminals, optionally in response to a request, a list of functions for editing visual content, such one or more images or video files, according to some embodiments of the present invention. As used herein, editing comprises processing one or more images or frames of a video file, optionally pixel wise, using image filters to filter an image or some or all frames of a video file, adding visual content to an image or one or more frames of a video file, for example graphic elements, adding audible content to an image and/or a video file, overlying or embedding text boxes, overlying or embedding graphical elements, and/or the like, adding frames to a sequence of frames in a video file, and/or the like. For brevity, overlying and embedding may be used herein interchangeably. For brevity, visual content added to the edited visual content is referred to as a visual overlay or overlay. Audible content added to the edited visual content is referred to as a sound overlay.

The system 100 allows users of the client terminals 102 to receive a list of visual content editing functions and to select one or more functions therefrom for editing a selected visual content, such as an image or a video file, for example before the sending and/or the uploading of the visual content, for example as a visual message, for example a visual twit, such as a Mobli™ message, Twitter™ message and/or an Instagram™ message. As used herein, a client terminal means, a mobile telephone, a Smartphone, a tablet, a laptop, a camera having a network interface and/or the like.

The system 100, which is optionally implemented using one or more network servers, includes a network interface 103, such as network interface card and/or a port. The network interface facilitates the establishing of bidirectional communication between the system 100 and the client terminals 102. This communication allows the system 100 to receive requests for visual content editing functions and to respond with a list of selected visual content editing functions, for example as described below.

The system 100 further includes a repository 104 for hosting the visual content editing function records, optionally associated with the visual content editing functions and a selection module 105 which receives the request for visual content editing functions via the network interface 103 and generates a list of visual content editing functions according to request, for example as described below. The list is optionally forwarded to the client terminals via the network interface 103.

Optionally, each client terminal 102 hosts a local module 106, such as an app, a widget, or an add on, with a user interface, for example a graphical user interface (GUI), that presents the user with the option to select visual content for adaptation. For example, the client terminal allows the user to select a file from the memory of the client terminal, a social network profile, an image repository account, such as flicker, and/or the like. Additionally or alternatively, the user interface is adapted to allow the user to send an image or a video taken using the client terminal for processing by one of the plurality of visual content editing functions. For example, the client terminal is a cellular device having an image sensor and a user interface that allows a user to select a member of a list of visual content editing functions which are presented thereto, for example as exemplified below. Optionally, a plurality of user profiles, such as subscriber profiles, are stored and managed the system 100, for example as described below. Optionally, the user profiles are subscriber profiles of a social network, which are managed by a subscriber database, for example managed by separate web servers 107 and/or in a local repository.

Figure 2A:
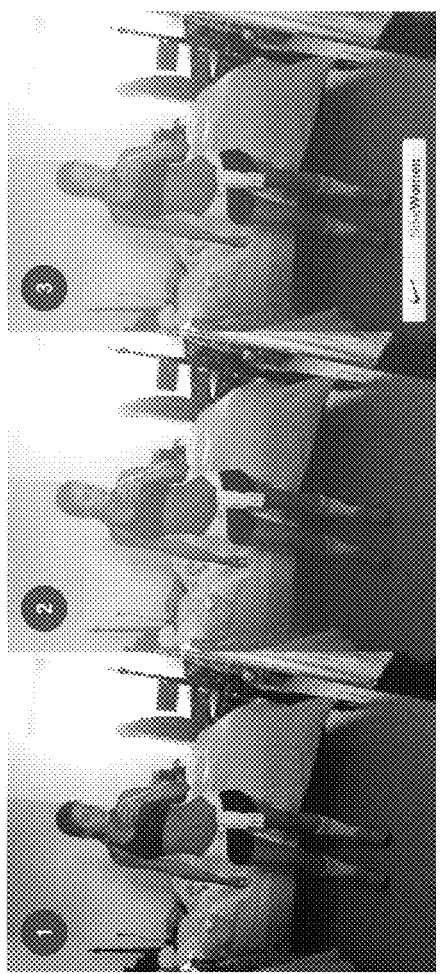
FIGS. 2A and 2B are sets of images where each set includes an original image, a color filtered image, and a color filtered image with an overlay addition of the Nike™ logo, according to some embodiments of the present invention.
Figure 2B:

According to some embodiments of the present invention, users may generate visual content editing functions. These visual content editing functions are than uploaded to the repository 104 and a respective documenting record is formed. Optionally, the user defines the sharing of the visual content editing functions. For example, the user defines whether the visual content editing functions are for personal use only, for friends use, and/or for public use. In such embodiments, the visual content editing functions may be tagged with their sharing rights. Optionally, the local module 106 includes visual content editing functions generation module. The generated functions may be customized overlays with selected graphic, color filter with selected colors, and/or any other filters which are planned by the user. For example, each one of FIGS. 2A and 2B depicts a set of images the first, marked with (1) is the original, the second, marked with (2) is when a color filter is applied, and the third, marked with (3) is when a color filter is applied with an overlay addition of the Nike™ logo. The generated functions may be customized sound overlays with selected tones and/or soundtrack. As used herein, a sound overlay means a soundtrack, a music file, and/or any audible content that is set to be played simultaneously to the presentation of the visual content. For example, the sound overlay may an audible advertisement, optionally personalized, music selected by the uploading user, music selected for the uploading user, for instance using an automatic music selection module, such as Genius™ of Apple™, and/or the like.

Figure 3:
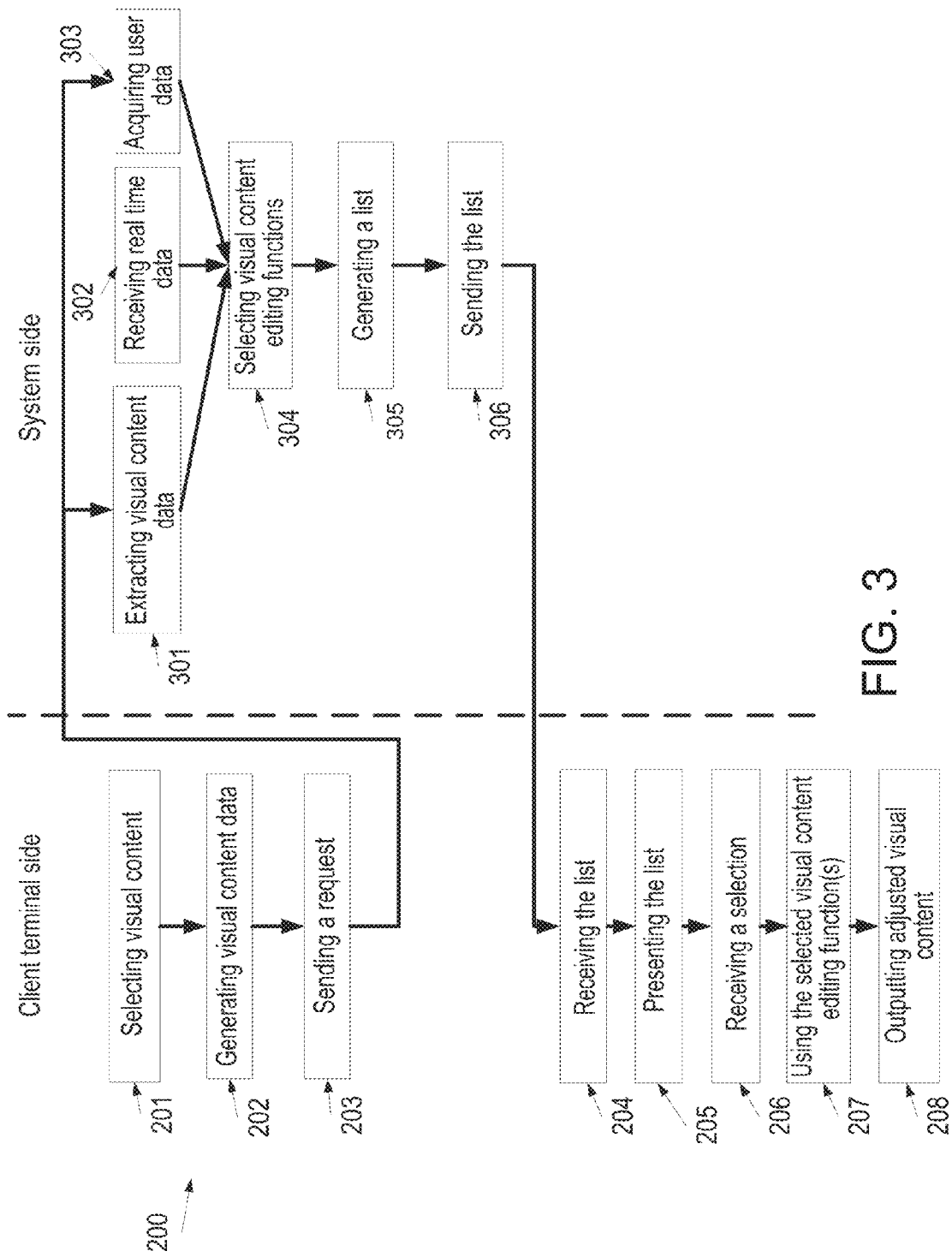
FIG. 3 is a flowchart of a method for processing visual content using one or more visual content editing functions, according to some embodiments of the present invention.

Reference is now made to FIG. 3, which is a flowchart of a method 200 for processing visual content, such as an image or a video file, using one or more visual content editing functions, according to some embodiments of the present invention.

First, as shown at 201, visual content is selected for editing by the user. The selection is optionally performed using a user interface on the client terminal, for example a GUI that is presented on a touch screen of client terminal. The selected visual content may be selected from an internal or an external library or a currently captured image or video file.

Optionally, as shown at 202, visual content data is generated. Optionally, the visual content is locally processed to identify descriptive features that allow classifying depicted scenes and/or characters and/or for identifying certain objects. The image processing may be performed using known image processing algorithms, such as face portion recognition algorithm, a close up detection algorithm, a motion detection algorithm and/or the like. In such an embodiment, the visual content data includes include the descriptive information.

Additionally or alternatively, the visual content data includes positional data pertaining to the location of the client terminal. The positional data, such as location, velocity, and/or acceleration, is optionally acquired from a global positioning system (GPS) unit of the client terminal, assisted GPS, or any other positioning system.

Additionally or alternatively, the visual content data includes information pertaining to the type of the client terminal.

Additionally or alternatively, the visual content data includes user identification (ID) pertaining to the user of the client terminal, for example as described below.

Now, as shown at 203, a request with the visual content data is sent to the system 100, for example as a hypertext transfer protocol (HTTP) message or any other web message.

Optionally, the request includes visual content data pertaining to the selected visual content. The visual content data allows the system 100, for example the selection module 105 to select and/or adapt visual content editing functions to be sent, in response, to the client terminal. For example, at the system side, as shown at FIG. 3, in response to the request from a client terminal, a list of visual content editing functions is generated. First, as shown at 301, the visual content data is extracted from the received request. Additionally or alternatively, as shown at 302, real time is acquired, for example by using web crawlers and/or by accessing selected databases and/or websites for example as described below. Additionally or alternatively, as shown at 303, user data is acquired, for example by accessing social network profiles and/or the aforementioned subscriber database. The user data is acquired with respect to a user ID that is extracted from the request, for example a subscriber ID. This user ID may be provided by the local module 106 and/or from any ID tag of the client terminal.

Now, as shown at 304, based on the visual content data, the real time data, and/or the user data, a plurality of visual content editing functions are selected from the repository 104.

According to some embodiments of the present invention, for example as described above, the visual content data includes positional data. In these embodiments, the positional data is analyzed to select specific location related visual content editing functions.

In such embodiments, some of all of the related visual content editing function records in the repository 104 may be tagged, and optionally weighted, according to their relevancy to a certain geographical area (i.e. coordinates, a country, a city, and a street) and/or location type (i.e. a restaurant, a working place, home, a bar, an amusement park, a train station, a shop, a mall, and a sport venue).

Optionally, each visual content editing function record includes an array of weighted tags (i.e. scored and/or ranked) each given a value according to the affinity of the respective visual content editing function to a different location type and/or geographical area. In use, the user positional data is matched with the array of weighted tags of each one of the visual content editing function records to identify one or more relevant visual content editing functions.

In such a manner, for example, if the positional data is indicative that the visual content was captured in Australia, a visual content editing function which provides an overlay of the Australian flag and/or a sound overlay of the Australian anthem and/or Australian popular music may be selected. In another example, if the positional data is indicative that the visual content was captured in New York, a visual content editing function which provides an overlay of the statue of liberty and/or a sound overlay of the song New York New York may be provided. In another example, if the positional data is indicative that the visual content was captured in a café, a visual content editing function which provides an overlay of a coffee supplier, the caféplace, and/or café related activities and/or a sound overlay with which is related to café are provided.

According to some embodiments of the present invention, visual content editing functions are selected according to a velocity that is measured for the client terminal. The velocity is optionally part of the positional data, for example as outlined above. Similarly to the above, the visual content editing function records may include one or more tags which are indicative of the relevancy of a respective visual content editing function to one or more velocities. In such a manner, for example, a visual content editing function which may be selected to high velocities may be an overlay with a "road trip" logo, a smear filter for increasing or decreasing a smearing artifact, a suitable soundtrack and/or the like.

According to some embodiments of the present invention, the real time data includes one or more real time events which occurred lately, for example in the last few hours, days, or weeks. Optionally, the real time events are acquired from news aggregators, such as Google™ News, and/or from different websites using web crawlers. Optionally, semantic and/or statistic analysis is used to extract keywords from the news events. Each visual content editing function record is optionally tagged with metadata that includes a plurality of characterizing words or sentences. The keywords may now be matched with the plurality of characterizing words or sentences of each record to determine the relevancy of the respective visual content editing function to the current events. Optionally, visual content editing functions may be uploaded by the operator in response to current events. In such an embodiment, the operator may manually add tag(s) to or update tag(s) of the visual content editing function records, for example with keywords and/or location relevancy data.

The matching between the current events and the visual content editing function records allows selecting visual content editing functions with a real time contemporary meaning. For example, visual content editing functions which are related to the environment, for example overlays with images of Greenpeace logo, images of wild animals, green color filters and/or respective audio may be selected when the current event is "Earth day". In another example, an overlay with a specific slogan is selected. Optionally, a sound overlay wherein the slogan is sound is selected.

Optionally, the real time events are weighted according to the scope of coverage they receive in news websites. These events may be weighted according to their geographical relevance to the user. For example, the real time events are weighted according to the scope of coverage they receive in news websites which handle local matters in proximity to the user. For example, the selection module 105 identifies the current location of the user, for example according to his positional data and weights news events from news websites according to their relevancy to the user location. In such an embodiment, news events from the website sandiego6.com which provides San Diego news from news events of general news websites if the user is located in San Diego.

The matching between positional data of the user and current events and the visual content editing functions allows selecting visual content editing functions which are related to current events in the neighborhood, the city, the country, and/or the area around the user. For example, specific location events such as elections for a local candidate in a U.S state may be matched for a user that is located in the respective U.S state with a visual content editing function that is tagged with the candidate's name, such as an overlay with her name. In another example, the location of the user is a stadium and the news indicate that a certain sport match occurs or about to occur in the stadium, visual content editing functions which are related to the playing teams, for example overlays with images of the logo(s) and/or player(s) of the teams, color filters with the colors of the logos of teams, and/or the like may be selected for the user.

According to some embodiments of the present invention, visual content editing functions are selected according to personal information pertaining to the user. Optionally, the system 100 manages a plurality of user profiles, such as subscriber profiles, for example as described above. Each user profile includes personal information pertaining to the user, such as demographic data, visual content editing functions selection history, location positional data history, and/or preferences. In use, the selection module 105 uses the user ID to identify a respective user profile. Additionally or alternatively, the system 100 uses the user ID to extract personal data from his social network page, for example gender, birth date, hometown, education, marital status, and/or interests. The user data from the user profile and/or the social network page is used to select visual content editing functions, for example according to tags in the visual content editing function records, similarly to the described above. In such embodiments, the user consent is optionally acquired.

Additionally or alternatively, the system 100 uses the user ID to extract personal data which defines favorite visual content editing functions. These favorite functions may be top used visual content editing functions, selected and/or tagged visual content editing functions, visual content editing functions which are used to create most of the posted images and/or the like.

In such embodiments, the visual content editing functions are tagged as suitable for users with certain demographic characteristic(s), such as age range, or a certain combination of demographic characteristics, for example age, gender, and marital status. For example, for the age group of between 12 and 17, a visual content editing function of an overlay with an image of Justin Bieber and/or a sound overlay with a song of Justin Bieber may be selected may be selected, for the combination of age and marital status, a visual content editing function of an overlay "I am single" or "I am a proud Mother" can be selected and based on the birth date, a visual content editing function of an overlay with the text "happy birthday", a sound overlay with the song "happy birthday" and/or graphical effect of balloons may be selected.

According to some embodiments of the present invention, visual content editing functions are selected according to the social activity of the user and/or his or her friends. For example, the selection module may access the social network profile to analyze the user's and/or the user's friends news feeds to match visual content editing functions, for example based on a keyword analysis, similarly to the described above regarding news events.

For example, visual content editing functions may be selected according to the user's social activity, such as checking in a certain place, such as a bar, attending a certain event, invited to a certain event, and/or adding indicative content, such as a status line or shared content. Likewise, based on user's friends' preferences may be taken into account when selecting visual content editing functions. For example, if the user profile indicates that the user checked-in a specific restaurant, visual content editing function(s), which are related to restaurants in general and/or to the specific restaurant, are selected. In another example if the user profile indicates that the user has a friend with a birthday, visual content editing function(s), which are related to birthdays in general, are selected.

In another embodiment, visual content editing functions are automatically generated based on the social network profile of the user and/or the selections of friends in his network. For example, a visual content editing function with an overlay that includes a copy of the status of the user may be generated. In another example, if a certain amount of friends of that user chose a specific visual content editing function, this visual content editing function is suggested for the user. In another example, if the user profile indicates that the user has a friend with a birthday, visual content editing function(s), which are related to the specific user who has a birthday, are generated, for example an overlay with the friend's name, a function selected from the most frequent functions he uses and/or the like. Friends' data may be acquired using a social connection graphs.

According to some embodiments of the present invention, visual content editing functions are selected according to previous user selections in the system 100. In such an embodiment, visual content editing functions, which were previously used by the user to enhance visual content, are recorded. This allows weighting visual content editing functions according to their usage prevalence, optionally based on additional terms, such as the location of the user when using the function, the time of the day the user uses the function, and/or the like. In such embodiments, visual content editing functions, which have been selected by the user more than a certain amount of times and/or during a certain time of the day and/or in a certain location, are selected or receive a high score or rank.

For example, if when the user visited in a certain location, for instance the Madison Square Garden, he choose a New York Nicks logo, a function with an overlay of the New York Nicks logo may be selected when the user is back in this location and/or in a similar location, for example in other sport venues.

As described above, a user may create customized visual content editing functions and upload them to the system 100. Optionally, visual content editing functions which are generated by the user and/or his friends, for example social network friends, are selected automatically and/or receive a high ranking in a selection process.

As described above, the visual content data may include descriptive features that allow classifying depicted scenes and/or characters and/or for identifying certain objects. In such an embodiment, visual content editing functions which are tagged as suitable for the descriptive features may be selected. For example, if a car is identified in the visual content, a visual content editing function with an overlay that say "I just pimped my ride" may be selected. If detected a plate or a food portion is identified, a visual content editing function with an overlay and/or a sound overlay that includes promotional content of a food company is presented. In another example, of smiling faces are identified, promotional content to a toothbrush maybe presented.

According to some embodiments of the present invention, the selection module combines some or more of the above methods for selecting visual content editing functions. Optionally, visual content editing functions are ranked or scored by some or all of the aforementioned selection methods. In such a manner, visual content editing functions which receive a cumulative rank or score above a certain threshold and/or a number of visual content editing functions with the top rank and/or score are selected for the list. In such a manner, visual content editing functions are scored according to data acquired from the user's social profile, positional data, and real time data.

Reference is now made, one again, to FIG. 3. Now, as shown at 305, a list which includes the selected visual content editing functions and/or indications of the selected visual content editing functions, for example exemplary thumbnails, is generated and forwarded to the client terminal, as shown at 306.

As shown at 204, the client terminal receives the list of a plurality of visual content editing functions and presents it, as shown at 205, to the user.

The user can now select, as shown at 206, one or more members of the presented list. Optionally, the selected visual content editing functions are stored in the client terminal, for example managed by the local module 106. Additionally or alternatively, the selected visual content editing functions are received in the list. Additionally or alternatively, the visual content editing functions are stored in the repository 104. In such embodiments, after the user selects one or more members, a request for the selected visual content editing functions is forwarded to system 100 which responds with the requested visual content editing functions.

Then, as shown at 207, the visual content is adjusted using the selected visual content editing function(s).

As shown at 208, the adjusted visual content may now be outputted, for example uploaded to a server, posted an/or shared with other subscribers of the system 100, for example as a visual twit, such as a Mobli™ message, Twitter™ message and/or an Instagram™ message, uploaded to a social network webpage and/or forwarded to one or more friends, for example as an electronic message such as an multimedia messaging service (MMS) message.

It is expected that during the life of a patent maturing from this application many relevant methods and/or devices will be developed and the scope of the term a module, a client terminal, and a controller is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of selecting visual content editing functions, the method being carried out by at least one network unit programmed to carry out the steps of the method, which comprise:

storing a plurality of records each with suitability data of one of a plurality of visual content editing functions;

receiving, at a server side, via a communication network and from an application installed in a client terminal, a request for visual content editing functions, said request comprises positional data pertaining to said client terminal;

analyzing textual content a plurality of content providing network sources available via a network to identify at least one current event;

selecting, at said server side, a group from said plurality of visual content editing functions according to said positional data and said at least one current event;

responding to said request of said client terminal by sending a response with said group;

wherein said application is adapted to present a graphical user interface (GUI) on a display of said client terminal, said GUI comprises a plurality of indications each for one of a plurality of members of said group so as to allow a user of said client terminal to edit locally said visual content on said client terminal with one or more of said plurality of visual content editing functions in response to a selection of any of said plurality of indications;

wherein said visual content comprises at least one of an image and a video file.

2. The method of claim 1, further comprising capturing said visual content using an image sensor installed in said client terminal.

3. The method of claim 1, wherein said selecting comprises using said positional data to classify the location of said client terminal, said selecting being performed according to said classification.

4. The method of claim 1, wherein said request comprises a velocity of said client terminal when said visual content is captured by said image sensor, said selecting being performed according to said velocity.

5. The method of claim 1, wherein said analyzing comprises at least one of a semantic analysis and a statistic analysis of said textual content.

6. The method of claim 1, further comprising acquiring at least one demographic characteristic of a user of said client terminal; wherein said selecting is performed according to said at least one demographic characteristic.

7. The method of claim 1, wherein said storing comprises automatically generating at least some of said plurality of visual content editing functions according to at least one of said visual content data, personal data pertaining to a user of said client terminal, and information acquired from textual content a plurality of content providing network sources.

8. The method of claim 1, wherein said request comprises user identification, said selecting comprises acquiring personal data pertaining to a user of said client terminal according to said user identification, said selecting being performed according to said personal data.

9. The method of claim 8, wherein said personal data being extracted from a social network profile.

10. The method of claim 8, wherein said personal data comprises a log of previously selected visual content editing functions from said plurality of visual content editing functions.

11. A method of selecting visual content editing functions, the method being carried out by at least one network unit programmed to carry out the steps of the method, which comprise:

storing a plurality of records each with suitability data of one of a plurality of visual content editing, functions;

receiving, at a server side, via a communication network and from an application installed in a client terminal, a request for visual content editing functions, said request comprises positional data pertaining to said client terminal;

selecting, at said server side, a group from said plurality of visual content editing functions according to said positional data; and responding to said request of said client terminal by sending a response with said group;

wherein said application is adapted to present a graphical user interface (GUI) on a display of said client terminal, said GUI comprises a plurality of indications each for one of a plurality of members of said group so as to allow a user of said client terminal to edit locally said visual content on said client terminal with one or more of said plurality of visual content editing functions in response to a selection of any of said plurality of indications;

wherein said visual content comprises at least one of an image and a video file wherein said request comprises user identification, said selecting comprises acquiring personal data pertaining to a user of said client terminal according to said user identification, said selecting being performed according to said personal data;

wherein said request comprises user identification, said selecting comprises acquiring social network data pertaining to a friend of a user of said client terminal in a social network according to said user identification, said selecting being performed according to said social network data.

12. A method of adjusting visual content, comprising:

selecting visual content on a client terminal;

extracting visual content data pertaining to said visual content;

analyzing textual content a plurality of content providing network sources available via a network to identify at least one current event:

forwarding to a network node via a communication network a request for visual content editing functions, said request comprises positional data pertaining to said client terminal;

receiving, from said network node and in response to said request, a plurality of visual content editing functions from said network node, said plurality of visual content editing functions being selected according to an analysis of said at least one current event and said positional data by said network node;

presenting a graphical user interface (GUI) to a user, said GUI is displayed on a display of said client terminal, said GUI comprises a plurality of indications, each of one of said plurality of visual content editing functions;

receiving a selection of one or more of said plurality of indications from said user;

in response to said selection editing visual content using one of said plurality of visual content editing functions; and outputting said adjusted visual content;

wherein said visual content comprises at least one of an image and a video file.

13. The method of claim 12, wherein said selecting comprises locally capturing said visual content using an image sensor installed in said client terminal.

14. The method of claim 12, wherein said selecting comprises accessing a database via said network and selecting said visual content using a user interface on said client terminal.

15. The method of claim 12, wherein said extracting comprises image processing said visual content to perform at least one of identifying an object having a predefined feature in said visual content, classifying a scene depicted in said visual content, recognizing a facial feature in said visual content, and detecting a moving object in said visual content and said request comprises an outcome of said image processing.

16. The method of claim 12, further comprising identifying positional data of said client terminal; said visual content data comprises said positional data.

17. The method of claim 12, wherein said request comprises user identification data; further comprising extracting personal data according to said user ID; wherein said plurality of visual content editing functions being selected according to said personal data.

18. A system of providing a plurality of visual content editing functions to a plurality of client terminals, comprising:

a processor adapted to analyze textual content a plurality of content providing network sources available via a network to identify at least one current event;

a network interface which receives via a communication network a request having positional data of a client terminal from a client terminal;

a repository which stores a plurality of records each with suitability data of one of a plurality of visual content editing functions; and a selection module which uses said processor to select a group of said plurality of visual content editing functions according said at least one current event and to said positional data;

wherein said network interface sends to said client terminal said group via said communication network as a response to said request so as to allow said client terminal to present a graphical user interface (GUI) that comprises a plurality of indications each of a member of said group on a display of said client terminal, wherein by a selection made using said GUI a user triggers a local edit of visual content on said client terminal with one of said plurality of visual content editing functions;

wherein said visual content comprises at least one of an image and a video file.

19. The system of claim 18, further comprising a plurality of client modules each allows a user to create a visual content editing function and update said repository with said created visual content editing function.

* * * * *